April 5, 1938.　　　C. W. CRUMRINE　　　2,113,319
CATCH MEANS FOR SHUTTER RELEASES ON CAMERA BODIES
Filed June 26, 1937

Chester W. Crumrine
INVENTOR
BY
ATTORNEYS

Patented Apr. 5, 1938

2,113,319

UNITED STATES PATENT OFFICE 2,113,319

CATCH MEANS FOR SHUTTER RELEASES ON CAMERA BODIES

Chester W. Crumrine, Rochester, N. Y., assignor to Eastman Kodak Company, Rochester, N. Y., a corporation of New Jersey Application June 26, 1937, Serial No. 150,571

12 Claims. (Cl. 95—53)

The present invention relates to a catch means for a shutter release on the camera body of a folding camera and more particularly to an arrangement of the panel latch initially to release said catch means upon unlatching of the panel and to an arm on the folding panel for maintaining said catch means disengaged when the panel is moved to full open position.

Various types of shutter releases including a finger member movably mounted in the camera body are known to the art. It is also recognized that such finger members may be manually retracted with respect to the camera body to prepare the camera for transportation.

The primary object of the present invention is the arrangement of a catch means normally engaging the finger member or manually operable means on the camera body to hold it in a retracted position and of a means which is necessarily operated during opening of the front panel of the camera to disengage such a catch means for normal extension of the finger member. Another object of the invention is the arrangement of the latch for the front panel to disengage the catch means for the release finger member when the latch is moved for disengagement of said front panel. A further object of the invention is the arrangement of an arm on the panel for holding the catch means in an inoperative position when the front panel is in full open position. Other and further objects of the invention will be suggested to those skilled in the art by the description which follows:

The above and other objects of the invention are attained in a folding camera having a foldable front panel and a shutter actuating mechanism including a manually operable member in the camera body and for actuating a shutter assembly on the front panel, by the arrangement of a catch means for engaging said finger member on the camera body and operative to maintain said finger member in a manually retracted position. The novel features of the invention include the provision of a panel latch for holding the front panel in closed position and for disengaging the aforementioned catch means when the latch is operated for disengagement of the front panel and also to an arm on the front panel which maintains said catch means in a disengaged position when the front panel is fully open.

Reference is hereby made to the accompanying drawing wherein similar reference characters designate similar elements and wherein.

The invention is illustrated with respect to a folding camera comprising the camera body, a folding panel, a shutter assembly and a shutter actuating mechanism including a manually operable member on the camera body.

The camera body includes a camera casing 10 having side walls 11, an inner mechanism plate 12 and provided with a recess 13.

Figure 1:
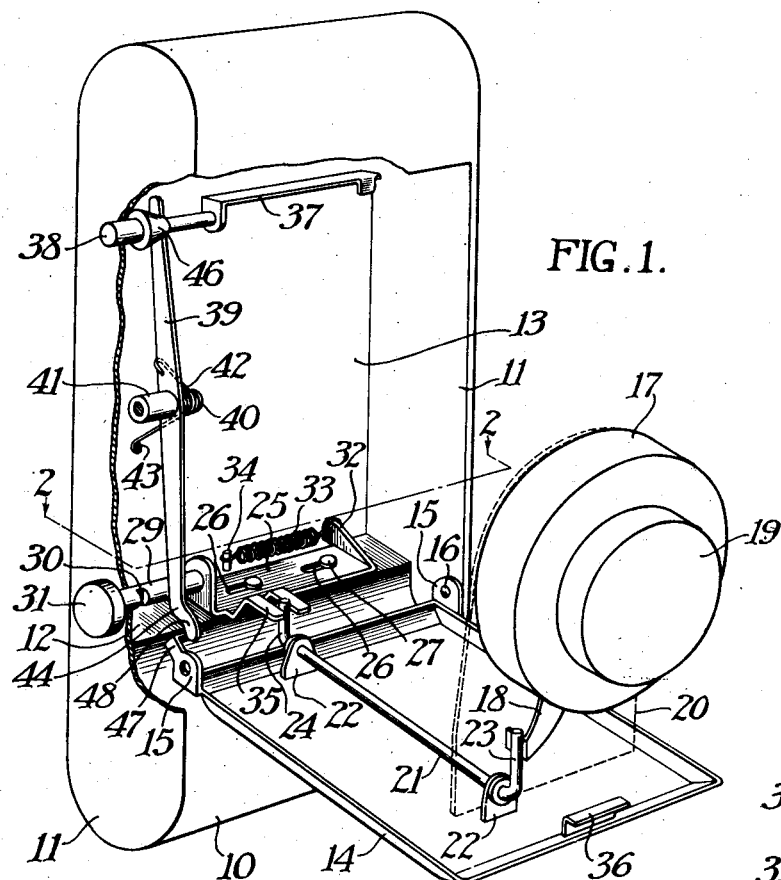
Fig. 1 is a perspective view of a folding camera equipped with a catch means and means for releasing the same according to the invention.
Figure 2:
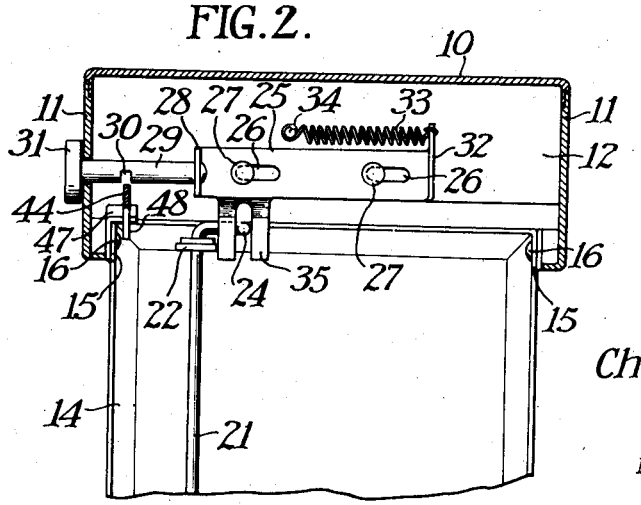
Fig. 2 is a partial horizontal section through the camera body taken on the line 2—2 of Fig. 1, and showing the finger member on the camera body in retracted position.

The front panel 14 is operatively connected to the camera body in any conventional fashion, specifically disclosed herein as constituting ears 15 on front panel 14 and hinged to the side walls 11 of the camera body by rivets 16. A photographic shutter 17 having an operating arm 18 supports a photographic objective 19 and may be mounted upon the front panel 14 in a known manner, such as upon a front plate 20 indicated in dotted lines in Fig. 1.

The shutter actuating mechanism may be arranged in any of a variety of ways but has been illustrated as including an actuator rod 21 which is mounted by brackets 22 upon front panel 14 for rotation about a longitudinal axis. The shutter actuator rod 21 also includes a front upright portion 23 and a rear upright portion 24.

Said shutter actuating mechanism also includes a manually operable member on the camera body and which may comprise a slide 25 provided with slots 26 engaging headed pins 27 on inner mechanism plate 12 for guiding said slide 25 in its transverse movement with respect to the camera body. Said slide 25 includes an upright flange 28 to which a rod 29 is attached. The rod 29 is provided with a notch 30, extends through the side wall 11 of the camera body and carries on its outer end a finger button 31.

Slide 25 also carries a lug 32 which is connected to one end of a coil spring 33. The other end of coil spring 33 is attached to a pin 34 on mechanism plate 12 so that the slide 25 is normally maintained with rod 29 and finger button 31 in extended position with respect to the side wall 11 of the camera body. Slide 25 also includes a jaw member 35 which engages the rear upright portion 24 of actuator rod 21 so that upon transverse movement of slide 25 against the action of spring 33, the actuator rod 21 is rotated for actuation of the operating arm 18 of photographic shutter 17. Furthermore, the jaw member 35 so engages upright portion 24 of actuator rod 21 that the front panel 14 may be folded and moved to open position without interference and so that slide 25 and actuator rod 21 are always interconnected when the front panel 14 is moved to open position.

The latch means for the front panel 14 may comprise a tongue 36 on the forward end of front panel 14, a latching bar 37 slidably mounted in a known manner within camera casing 10 and an operating plunger 38 which is attached to latching bar 37 and which extends through the side wall 11 of the camera body. The construction thus far described merely provides a background for the novel features of the invention for it is already known that the photographic shutter 17 and photographic objective 19 may be folded into the camera body recess 13 which is then covered by the front panel 14 when moved to a closed position and whereupon the latch bar 37 engages the tongue 36 to lock said panel 14 in closed position. It is also known that the operating plunger 38 may be moved to release tongue 36 from latch bar 37 and that folding panel 14 may be moved to an open position and that shutter 17 may be moved to an operative position on the front panel 14 whereupon the shutter actuating mechanism becomes operative for actuation of operating arm 18 on shutter 17.

Figure 3:
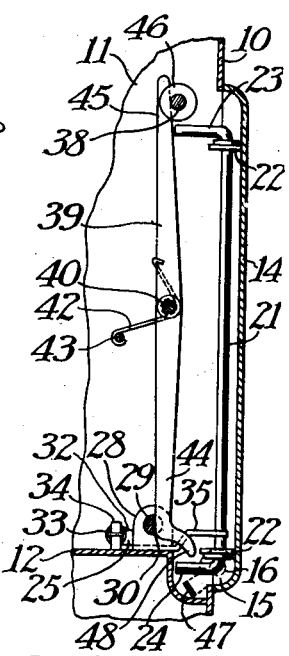
Fig. 3 is a partial vertical section through the camera body showing the folding panel in closed position.

It is very desirable to arrange the manually operable member on the camera body so that it may be retracted and held in retracted position when the front panel is closed and for transportation of the camera. According to my invention a catch means is provided so as to normally engage the manually operable member to maintain the same in a manually retracted position. Such a catch means may comprise a lever arm 39 which is intermediately pivoted on the side wall 11 by a headed stud 40 and which is spaced from said side wall 11 by a sleeve 41. A spring member 42 encircles headed stud 40, has one end attached to a pin 43 also on side wall 11 and has the other end hooked over lever arm 39 so that the lower end 44 of lever arm 39 is normally moved toward rod 29 and so that the upper end 45 of lever arm 39 is normally moved toward the operating plunger 38 of the panel latch means. When the front panel 14 is moved to the closed position illustrated in Fig. 3, the lever arm 39 assumes its normal position bearing on rod 29 so that manual retraction or depression of finger button 31 and rod 29 will bring notch 30 into engagement with the lower end 44 of lever arm 39 and said rod 29 and button 31 will be held in such retracted position. It will be understood that in closed position of panel 14 the upright portion 23 of actuator rod 21 is inoperative with respect to the operating arm 18 of shutter 17 so that such manual retraction of button 31 and rod 29 will not cause operation of shutter 17. Since the finger button 31 is now maintained close to the side wall 11 of casing 10 there will be no possibility of said button 31 causing interference with clothing, etc., or being damaged during transportation of the camera.

The essence of the invention resides in the provision of means which are necessarily operated during opening of the front panel 14 to render the aforementioned catch means inoperative and so that the finger member 31 and rod 29 may be moved to their normally extended positions and may be manually retracted for shutter actuation without being maintained in the retracted position which is desired when the camera is to be transported. One such means may comprise a cam member 46 mounted on operating plunger 38 and arranged with respect to the upper end 45 of lever arm 39 so that upon movement of plunger 38 to release latching bar 37 from tongue 36 the lower end 44 of lever arm 39 is moved out of notch 30 in rod 29 and coil spring 33 may function to extend rod 29 and finger button 31 from the side wall 11 of the camera body. Since the catch means is disengaged or rendered inoperative only temporarily because the latch means is only momentarily operated for release of the folding panel 14, it is desirable to provide a further means for maintaining the catch means in inoperative position when the folding panel 14 is moved to fully open position. Otherwise each actuation of the finger member on the camera body would cause engagement with the catch means and require operation of the latch means for a second actuation of the finger member.

Accordingly, an arm 47 is attached for movement with the front panel 14, such as being provided upon one of the ears 15. Said arm 47 extends into the recess 13 of the camera body and engages a hook 48 on said lower end 44 of lever member 39 only when the folding panel 14 has been moved to the fully open position illustrated in Fig. 1. Such arrangement of arm 47 maintains lever member 39 in an inoperative position at all times when the front panel 14 is in open position so that the finger member or rod 29 and finger button 31 on the camera body may be repeatedly actuated for shutter operation without engaging the catch means. When front panel 14 is folded, arm 47 disengages hook 48 so that lever arm 39 normally returns to its operative position for engagement with notch 30 when rod 29 and finger button 31 are manually retracted.

Since many variations of the present invention may be accomplished without departing from the spirit thereof, the present disclosure is to be construed in an illustrative sense.

Having now particularly described my invention what I desire to secure by Letters Patent of the United States and what I claim is:

1. In a photographic camera, the combination with a camera body provided with a recess, a panel operatively connected to said camera body, adapted in closed position to cover said recess, and movable to an open position, and a shutter assembly on said panel and including an operating arm, of a shutter actuating means for actuating the shutter operating arm and including a manually operable member movably mounted on said camera body and movable to a retracted position, a catch means normally engaging said manually operable member and for holding the same in a retracted position, and a means necessarily operated during opening of said panel and for moving said catch means out of engagement with said manually operable member.

2. In a photographic camera, the combination with a camera body provided with a recess, a panel operatively connected to said camera body, adapted in closed position to cover said recess, and movable to an open position, a shutter assembly on said panel and including an operating arm, and a latch means between said panel and said camera body and for holding said panel in closed position, of a shutter actuating means for actuating the shutter operating arm and including a manually operable member movably mounted on said camera body, normally in an extended position but movable to a retracted position, a catch means for holding said manually operable member in retracted position and operated by movement of said latch means for release of said panel to disengage said manually operable member, and an arm movable with said panel and adapted upon movement of said panel to open position to engage said catch means and hold it out of engagement with said manually operable member.

3. In a photographic camera, the combination with a camera body provided with a recess, a panel operatively connected to said camera body and movable to a closed position for covering said recess, a shutter assembly mounted on said panel and including an operating arm, and a latch means between said panel and said camera body and for holding said panel in closed position, of a shutter actuating means for actuating said shutter operating arm and including a manually operable member movably mounted on said camera body and movable to a retracted position, and a catch means for holding said manually operable member in retracted position, and operated by movement of said latch means for release of said panel to disengage said manually operable member of the shutter actuating means.

4. In a photographic camera, the combination with a camera body provided with a recess, a panel operatively connected to said camera body and movable to a closed position for covering said recess, a shutter assembly mounted on said panel and including an operating arm, and a latch means between said panel and said camera body and for holding said panel in closed position, of a shutter actuating means for actuating said shutter operating arm and including a manually operable member movably mounted on said camera body, normally extending from said camera body but movable to a retracted position, and a catch means for holding said manually operable member in retracted position, and operated by movement of said latch means for release of said panel to disengage said manually operable member and to permit movement thereof to normally extended position.

5. In a photographic camera, the combination with a camera body provided with a recess, a panel operatively connected to said camera body and movable to a closed position for covering said recess, a shutter assembly mounted on said panel and including an operating arm, and a latch means between said panel and said camera body and for holding said panel in closed position, of a shutter actuating means for actuating said shutter operating arm and including a manually operable member movably mounted on said camera body and movable to a retracted position, and a catch means, normally engaging said manually operable member to hold the same in retracted position and operated by movement of said latch means for release of said panel to disengage said manually operable member of the shutter actuating means.

6. In a photographic camera, the combination with a camera body provided with a recess, a panel operatively connected to said camera body and movable to a closed position for covering said recess, a shutter assembly mounted on said panel and including an operating arm, and a latch means between said panel and said camera body and for holding said panel in closed position, of a shutter actuating means for actuating said shutter operating arm and including a manually operable member movably mounted on said camera body, normally extending from said camera body but movable to a retracted position, and a catch means normally engaging said manually operable member to hold the same in retracted position and operated by movement of said latch means for release of said panel to disengage said manually operable member and to permit movement thereof to normally extended position.

7. In a photographic camera, the combination with a camera body provided with a recess, a panel operatively connected to said camera body, adapted in a closed position to cover said recess, and movable to an open position, and a shutter assembly on said panel and including an operating arm, of a shutter actuating means for actuating the shutter operating arm and including a manually operable member mounted on said camera body and movable to a retracted position, a catch means mounted on said camera body and for holding said manually operable member in retracted position, and a latch means between said camera body and panel, for holding said panel in closed position, and including a portion adapted, upon movement of said latch means for opening of said panel, to move said catch means out of engagement with said manually operable member.

8. In a photographic camera, the combination with a camera body provided with a recess, a panel operatively connected to said camera body, adapted in a closed position to cover said recess, and movable to an open position, and a shutter assembly on said panel and including an operating arm, of a shutter actuating means for actuating the shutter operating arm and including a manually operable member mounted on said camera body and movable to a retracted position, a catch means mounted on said camera body and for holding said manually operable member in retracted position, and a latch means on said camera body for holding said panel in closed position, and including a cam member which is moved by movement of said latch means for opening of said panel to move said catch means out of engagement with said manually operable member.

9. In a photographic camera, the combination with a camera body provided with a recess, a panel operatively connected to said camera body, adapted in a closed position to cover said recess, and movable to an open position, and a shutter assembly on said panel and including an operating arm, of a shutter actuating means for actuating the shutter operating arm and including a manually operable member slidable with respect to said camera body, provided with a notch, and movable to a retracted position, a lever arm pivoted on said camera body, normally urged to engage the notch in said manually operable member when the same is in retracted position, and a latch means on said camera body for holding said panel in closed position, and including a cam member which, upon movement of the latch means for opening of said panel, moves said lever member out of engagement with said notch in the manually operable member.

10. In a photographic camera, the combination with a camera body provided with a recess, a panel operatively connected to said camera body, movable to a closed position for covering said recess and movable to an open position, and a shutter assembly on said panel and including an operating arm, of a shutter actuating means for actuating the shutter operating arm and including a manually operable member movably mounted on said camera body and movable to a retracted position, a catch means normally engaging said manually operable member to hold the same in retracted position, and an arm movable with said panel and adapted upon movement of said panel to open position to engage said catch means and hold it out of engagement with said manually operable member.

11. In a photographic camera, the combination with a camera body provided with a recess, a panel operatively connected to said camera body, movable to a closed position for covering said recess and movable to an open position, and a shutter assembly on said panel and including an operating arm, of a shutter actuating means for actuating the shutter operating arm and including a manually operable member movably mounted on said camera body and movable to a retracted position, a lever arm pivoted on said camera body and for normally engaging said manually operable member to hold the same in retracted position, and an arm mounted on said panel and adapted upon movement of said panel to open position to engage said lever arm and to hold it out of engagement with said manually operable member.

12. In a photographic camera, the combination with a camera body provided with a recess, a panel operatively connected to said camera body, adapted in closed position to cover said recess, and movable to an open position, a shutter assembly on said panel and including an operating arm, and a shutter actuating means for actuating the shutter operating arm and including a manually operable member slidably mounted on said camera body, provided with a notch, and movable to a retracted position, of a lever arm intermediately pivoted on said camera body and normally urged for engagement of one end thereof with said notch when said manually operable member is in retracted position, a latch means on said camera body for holding said panel in closed position, and including a cam member adjacent the other end of said lever arm for moving the same out of engagement with said notch upon movement of said latch means for opening of said panel, and an arm mounted on said panel and adapted upon movement of said panel to full open position to engage the other end of said lever arm and hold it out of engagement with said manually operable member.

CHESTER W. CRUMRINE.